United States Patent [19]
Lightner

[11] 3,947,882
[45] Mar. 30, 1976

[54] VENDING SYSTEM FOR REMOTELY ACCESSIBLE STORED INFORMATION

[76] Inventor: Robert W. Lightner, P.O. Box 42, Cocoa Beach, Fla. 32931

[22] Filed: Nov. 29, 1972

[21] Appl. No.: 310,565

Related U.S. Application Data
[62] Division of Ser. No. 148,714, June 1, 1971, Pat. No. 3,718,906.

[52] U.S. Cl. .................. 360/92; 360/15; 360/69; 360/132
[51] Int. Cl.² G11B 15/68; G11B 5/86; G11B 23/04; G11B 15/02
[58] Field of Search .......... 179/100.2 MD, 100.2 Z; 360/92, 15, 69, 132

[56] References Cited
UNITED STATES PATENTS

| | | | |
|---|---|---|---|
| 3,140,360 | 7/1964 | Whitworth | 170/100.2 MD |
| 3,247,328 | 4/1966 | Mitchell et al. | 179/100.2 MD |
| 3,265,817 | 8/1966 | Gilman | 179/100.2 Z |
| 3,340,369 | 9/1967 | Seidl | 179/100.2 Z |
| 3,692,956 | 9/1972 | Northrup | 179/100.2 Z |

*Primary Examiner*—Robert S. Tupper
*Attorney, Agent, or Firm*—Rose & Edell

[57] ABSTRACT

A vending system includes a central station at which various information stored on master recordings can be selectively accessed by purchasers from any of multiple remote vending machines, the accessed information being reproduced on cartridge-type storage media at that vending machine. The cartridge, upon receiving all of the selected information, is ejected from the vending machine for the permanent use of the purchaser. In a preferred embodiment the master recording medium comprises a plurality of rack-mounted endless master tapes continuously driven by a common capstan. The endless tapes are contained in a cartridge which includes a tape transport and playback head and is readily removable from the rack. The vending machine includes a storage magazine in which blank tapes receive recorded information and are then automatically ejected.

5 Claims, 14 Drawing Figures

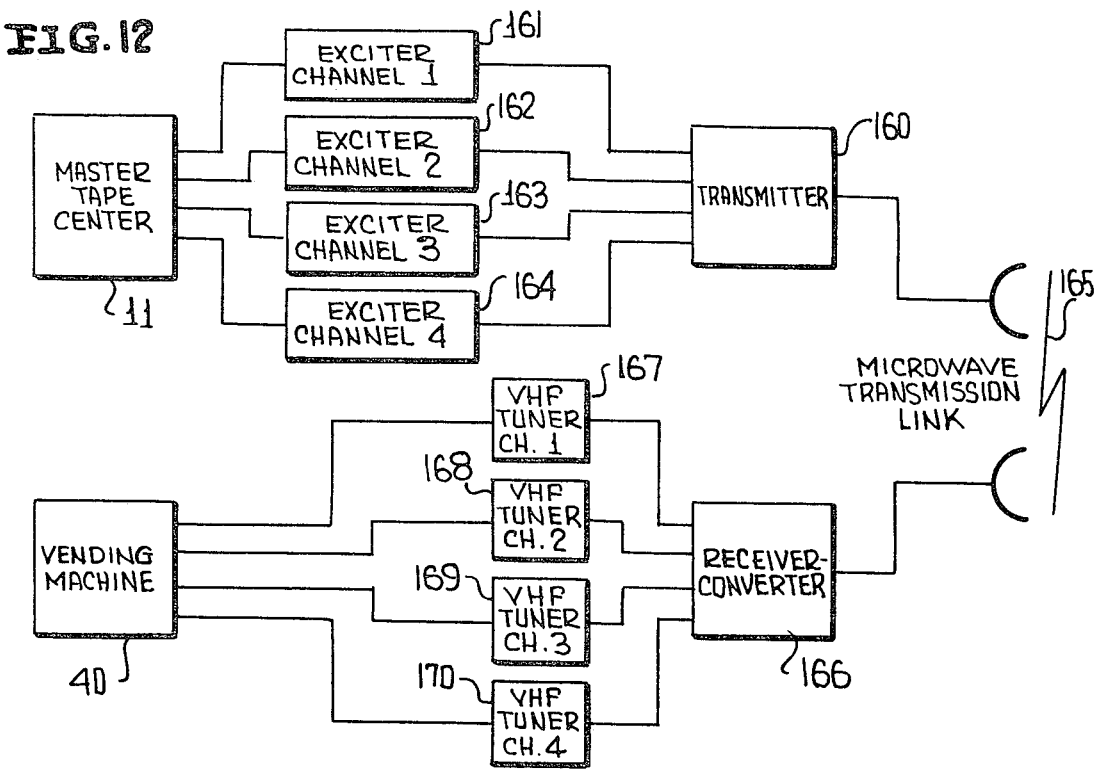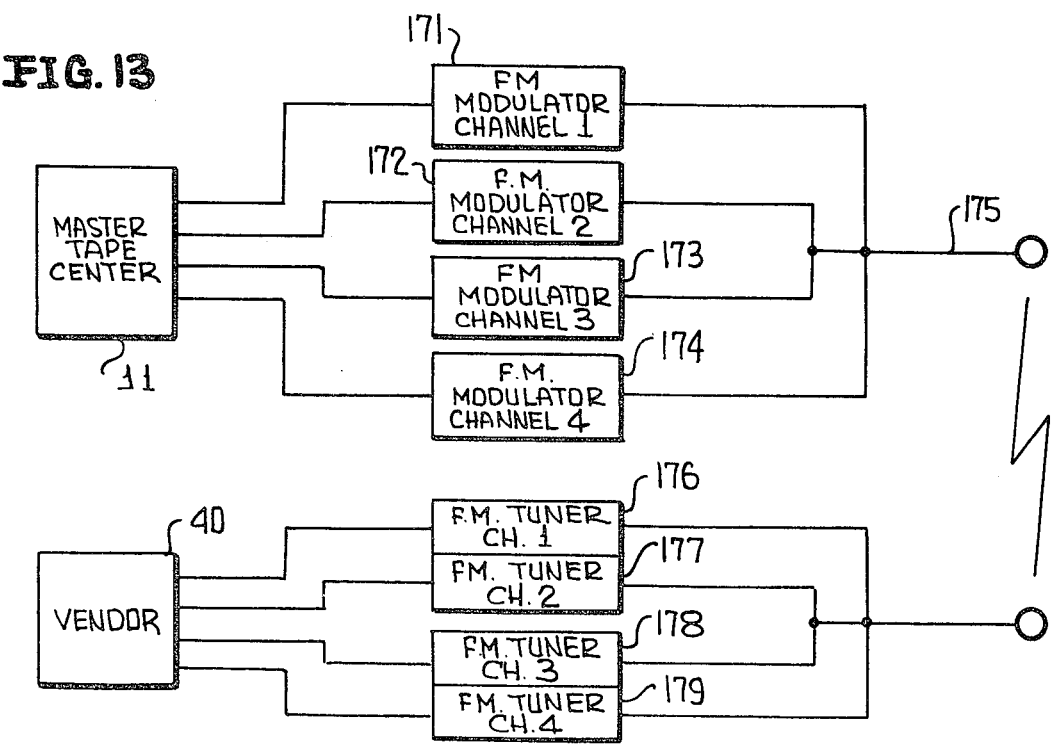

VENDING SYSTEM FOR REMOTELY ACCESSIBLE STORED INFORMATION

CROSS REFERENCE

This application is a division of U.S. patent application Ser. No. 148,714, now U.S. Pat. No. 3,718,906, filed June 1, 1971, entitled "Vending System for Remotely Accessible Stored Information".

BACKGROUND OF THE INVENTION

The present invention relates to a method and apparatus employing a vending machine concept to permit large scale rapid dissemination of centrally stored information. More particularly, the present invention relates to a system wherein purchasers at various vending machine locations can obtain recordings of selected information stored at a central station. The preferred embodiment of the present invention is described herein as utilized for the sale of commercial audio recordings; it is to be understood however that the present system is applicable to the distribution and sale of virtually any stored information, be it audio, video, etc.

The commercial recording industry, while immensely profitable, has a number of logistics problems. For example, the recording companies often cannot produce and distribute sufficient copies of extremely popular recording within a period of time that is fast enough to take advantage of the popularity peak for the recording. Invariably there are lost sales by virtue of the fact that some consumers cannot obtain copies of a recording until after the popularity of that recording has ebbed. Another problem for the recording companies is the large investment required in materials, labor and equipment for reproducing thousands and sometimes millions of copies of a recording.

On another scale, the retailer of commercial recordings, in order to provide his customers with a large selection, must have a considerable inventory investment. Quite often, because of changes in the popularity of various types of music, the retailer is left with stock that can only be sold below the retailer's cost.

Another phase of the problem in the recording industry may be viewed from the point of view of the consumer. Often, in the case of very popular recordings, the consumer must wait to obtain his copy because the retailer is temporarily sold out. Another problem faced by the consumer is his lack of choice in selecting the recordings he wishes to purchase. Specifically, the vast majority of recordings are albums containing a number of musical selections. If the consumer wishes to obtain copies of only one or two of the selections in an album, he is often forced to purchase the entire album because the desired selections are not available as single records. From the consumer's point of view it would be highly desirable to permit him to group various individual recordings to form an album of his own choosing.

It is therefore a broad object of the present invention to provide a system and method for distributing recorded information to consumers wherein the aforementioned problems are eliminated.

It is another object of the present invention to provide a system and method whereby a recording company can place its product on the market almost immediately while only producing a relatively small number of recording copies.

It is another object of the present invention to provide a system and method for distributing commercial recordings to the public which permits the retailer to avoid large investments in record copies.

It is still another object of the present invention to provide a system and method for distributing recordings to the public wherein the consumer can always obtain a copy of a currently popular recording.

It is still another object of the present invention to provide a system and method for distributing recordings to the public which permit the consumer to group individual recorded selections into an album of his own choice.

It is another object of the present invention to provide a system and method for rapidly and efficiently disseminating advertising messages.

SUMMARY OF THE INVENTION

In accordance with the present invention, a central computer master tape center is installed in each major market area and services a multiplicity of remote vending machines distributed throughout that area. The master tape center includes storage media, such as endless tapes, on which a large selection of recordings can be easily and rapidly stored and changed. The master tape center communicates with the various vending machines by means of any suitable transmission media. Each vending machine offers to the consumer a selection of anything stored in the master tape center. The vending machine includes a high speed duplicator and a quantity of recordable media, such as blank tape cassettes. The data selected by the consumer is transmitted from the master tape center to the vending machine where it is copied by the duplicator onto the cassette which is then ejected from the machine. Payment by the consumer may be in the form of currency, tokens, or credit cards which permit the consumer to maintain an account that is maintained current by a computer at the master tape center.

In a preferred embodiment of the invention, the master tape center includes multiple endless tapes which are arranged to be continuously driven by a common capstan. Each tape is individually accessible from any vending machine serviced by the master tape center.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 11 is a functional block diagram illustrating the operation of control circuits located at the master tape center of the system of FIG. 1;

FIG. 12 is a functional block diagram of an alternative approach to signal transmission between the master tape center and the various vending machines; and FIG. 13 is a functional block diagram illustrating a second alternative approach to signal transmission between the master tape center and the various vending machines.

DESCRIPTION OF THE PREFERRED EMBODIMENTS

Figure 1:
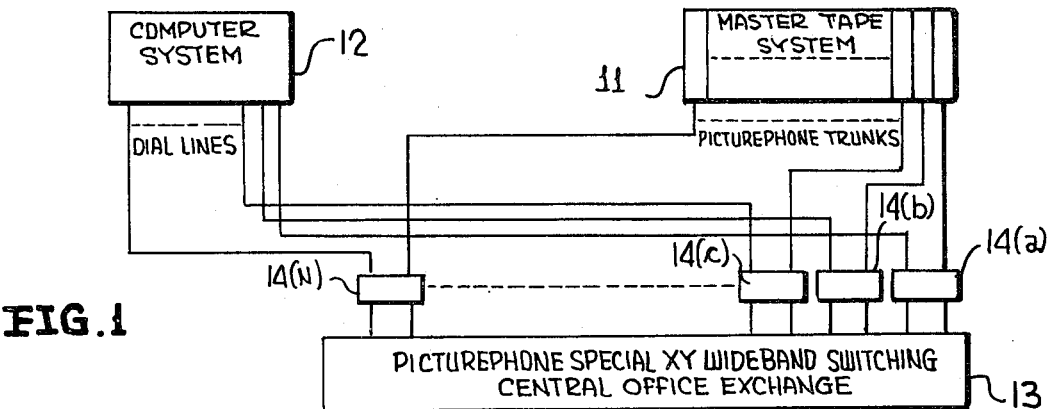
FIG. 1 is a functional block diagram of a preferred embodiment of the present invention.

Referring specifically to FIG. 1 of the accompanying drawings there is illustrated a system comprising a multiplicity of vending machines 10(1), 10(2), . . . 10(n), all serviced by a common master tape system 11 and a common computer system 12. Signal transmission and switching between the vending machines 10 and the computer and master tape systems is effected by unit 13, which in the preferred embodiment represents an American Telephone and Telegraph special wide band XY picture phone switching exchange, such as is presently employed in the Pittsburgh, Pennsylvania area for picture phone transmission. The picture phone transmission system responds to dialed instructions entered at each vending machine to connect that vending machine to a selected master tape so that the contents of the latter can be transmitted to the vending machine. Appropriate interface circuits 14(a), 14(b), 14(c) . . . 14(N), are employed to render the system compatible with the signal requirements for the picture phone system.

Each vending machine 10 includes a touch tone dialing device 15 from which standard telephone dial lines extend to the central picture phone office exchange 13. In addition a picture phone trunk line extends from each vending machine 10 to the central office exchange 13.

The master tape system includes a plurality of endless tapes, each associated with a respective playback head, as described below. Each playback head communicates with the central office exchange 13 by means of an appropriate picture phone trunk line and an interface circuit 14. The computer system communicates with central office exchange 13 via a plurality of dial lines, one dial line for each master tape in master tape system 11.

The standard telephone dial lines control the special wide band XY picture phone switching circuits at central office exchange 13, thereby cross-connecting any incoming wide band picture phone trunk line to any outgoing wide band picture phone trunk line. In broad terms, a consumer pushes pre-established combinations of buttons at touch tone device 15 in order to select which master tape, or portion thereof, he wishes to have reproduced on a blank cassette located at the vending machine.

Each of the master tapes may comprise one album of recorded selections, each master tape running continuously to permit multiple access to every album from any of vending machines 10. Tone signals, recorded after each selection in every album, signal vending machines waiting to receive that album so that reproduction may commence between selections rather than in the middle of a selection. Some of the master tapes, rather than have complete albums recorded thereon, store only one selection; this permits a customer at a vending machine to select that song, in addition to other singularly recorded selections, to compose an album of his favorite selections.

The finished product cassette ejected from the vending machine may be of any format including two channel stereo quarter track format, or four channel quadraphonic four track in-line format, depending upon the program format on the master tapes. The electronics and heads for both systems are preferably four channels so that either format may be employed in the loading of the desired master tape. In a two channel, quarter track format the two stereo channels are duplicated simultaneously at the vending machine for both directions of playback. This cuts the duplicating time in half, thereby allowing a 30 minute cassette to be duplicated (all four tracks, two in each direction) in the same time that a 15 minute cassette would normally require. Importantly, duplicating can be effected even though two tracks are running backwards without adversely affecting the quality of playback. In the preferred embodiment of the invention the standard C-30 (35 minute) cassette is vended at vending machines 10. In the four-channel quadraphonic format, playing time of the finished tape is half that of the finished quarter stereo tape because all four tracks are played back at the same time in the quadraphonic format. For such a system it is preferable that the standard C-60 cassette (70 minutes) be employed. Clearly, any length cassette or other tape cartridge may be utilized.

Figure 2:
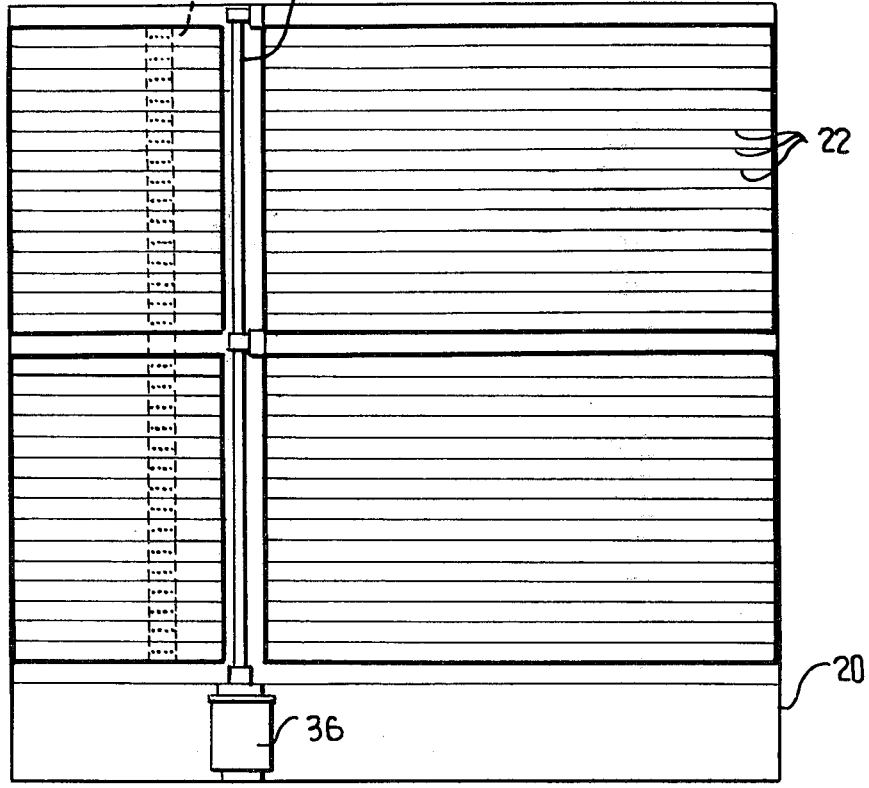
FIG. 2 is a front view in plan of a master tape transport cavity rack employed in the system of FIG. 1.
Figure 3:
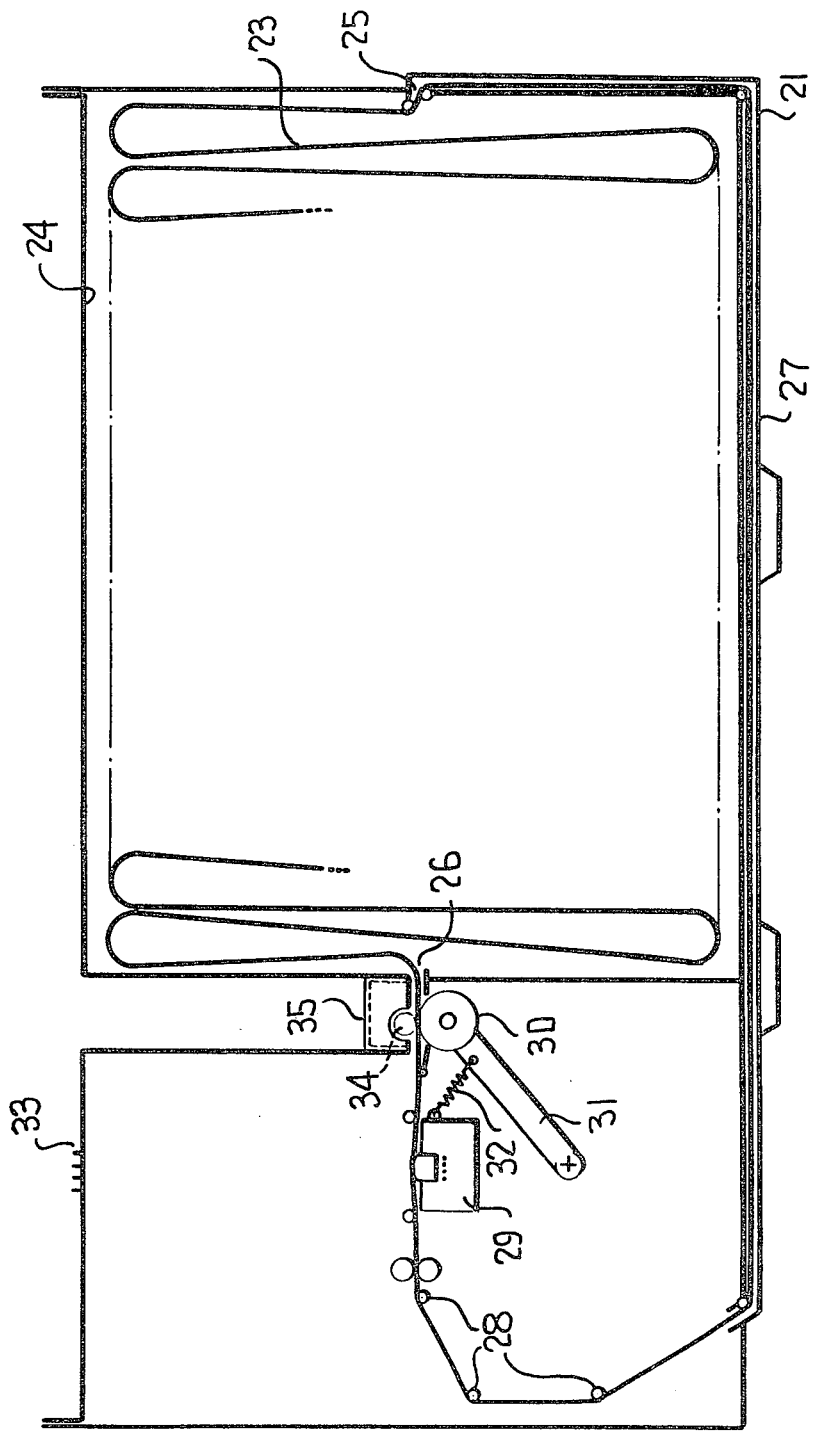
FIG. 3 is a top view in plan of a single master tape transport assembly utilized in the rack of FIG. 2.

Referring now to FIGS. 2 and 3 of the accompanying drawings, the master tape system includes a plurality of flat rectangular master tape transport units 21 which are adapted to be stacked in a tape transport cavity rack 20. By way of example only, rack 20 is illustrated as being capable of receiving thirty transport units 21, each at a respective shelf 22; however, it is to be understood that any number of transport units 21 may be stacked in a single cavity rack 20.

Master tape transport unit 21 includes a section of endless tape 23 stored in a bin 24 having an egress opening 25 and an ingress opening 26 between which a section of tape 23 extends exteriorly of bin 24. A master tape transport path extending between egress opening 25 and ingress opening 26 includes the following elements: A guide channel 27 defined between a portion of the wall of bin 24 and the exterior wall of transport unit 21; a series of tape guides 28; a four channel playback head 29; and pinch roller 30. Pinch roller 30 is urged into driving position by spring 32 attached to pinch roller pivot arm 31. The four output channels from playback head 29 are electrically connected to respective contact pins 33 extending outwardly from the rear edge of the transport unit 21.

The rear edge of transport unit 21 includes a recessed portion which extends to the point at which master tape 23 passes pinch roller 30. This permits the master tape to be engaged between the pinch roller 30 and a capstan 34 when the master tape transport unit 21 is slid into rack 20 in one of shelves 22. Capstan 34, as viewed in FIG. 2, extends along the entire vertical length of rack 20 so as to engage each of the master tapes installed in the rack. A capstan drive motor 36 provides continuous rotary drive for capstan 34. A capstan shield 35 surrounds a portion of the capstan periphery and prevents master tape 23 from wrapping around the capstan or pinch roller 30. A connector strip 37 extends vertically along the rear interior wall of rack 20 and includes a series of four female connectors each adapted to receive a set of four contact pins 33 from a respective master tape transport unit 21 mounted in the rack. The output signals from each master tape transport unit are amplified and multiplexed in the manner described hereinbelow.

Figure 4:
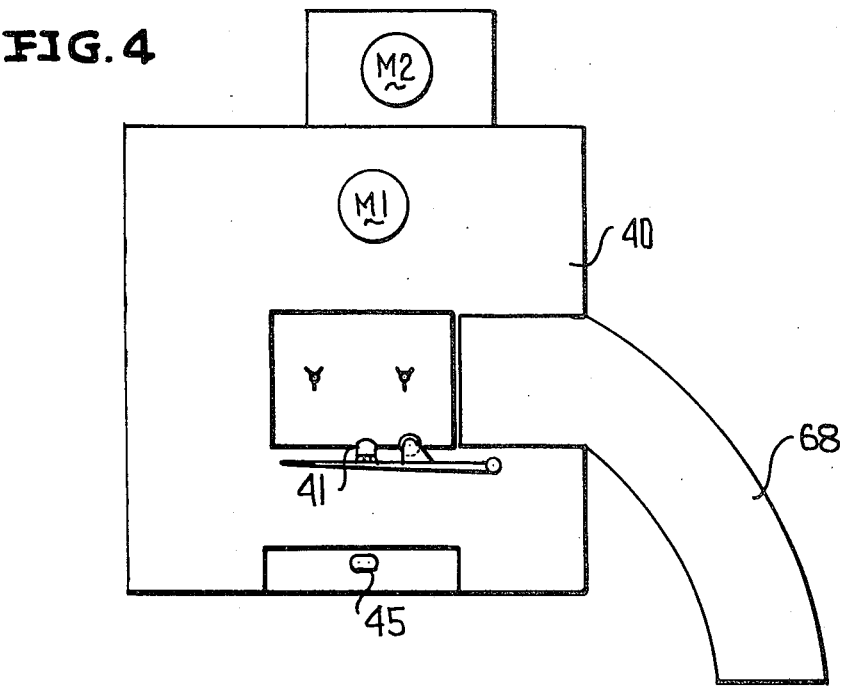
FIGS. 4 and 4a are diagrammatic illustrations of the cassette changer employed in the system of FIG. 1, wherein the modifications of a commercially available cassette changer are specifically represented.
Figure 4A:
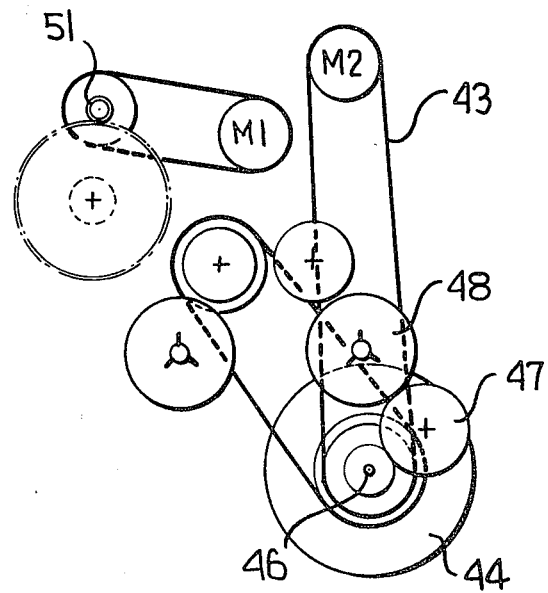
Figure 5:
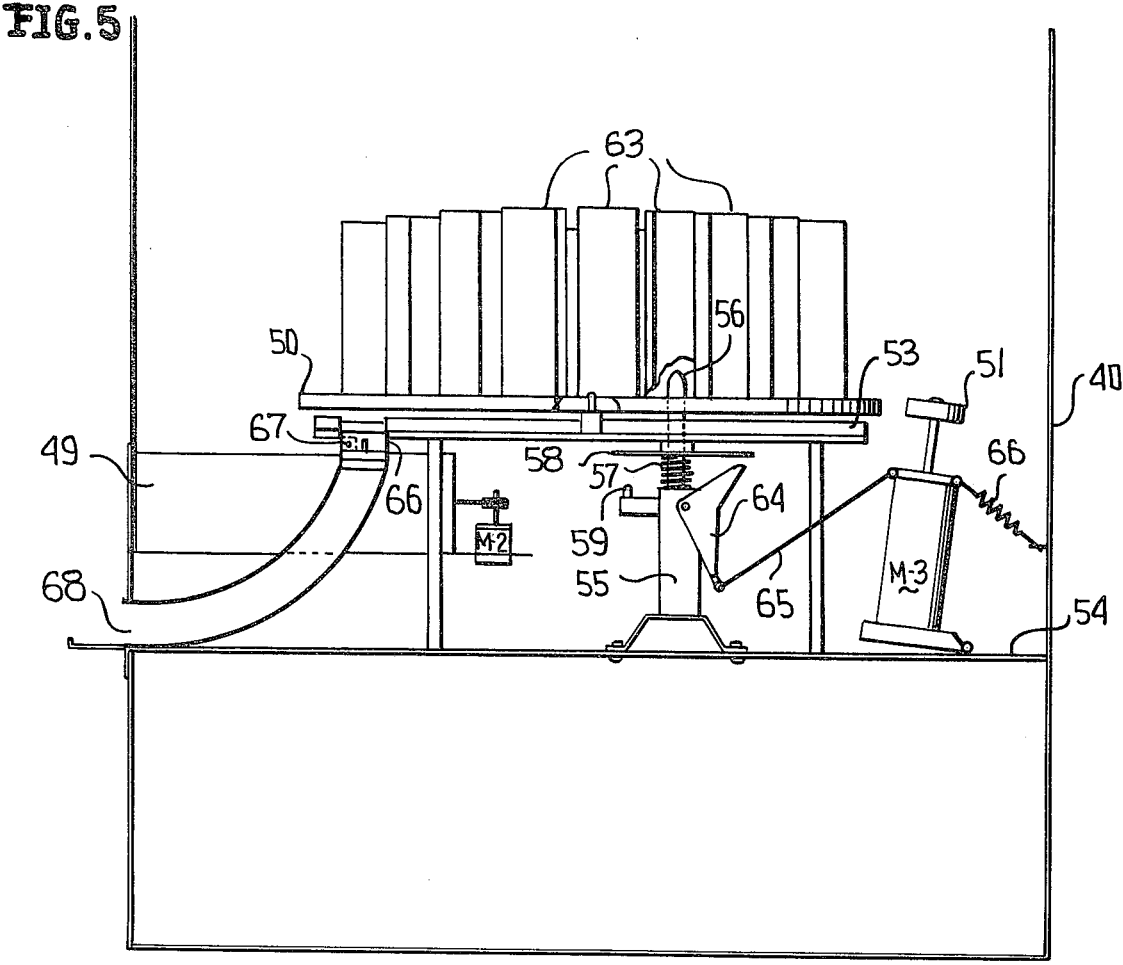
FIG. 5 is a side view in plan of a cassette vending machine mechanism employed in the present invention.
Figure 6:
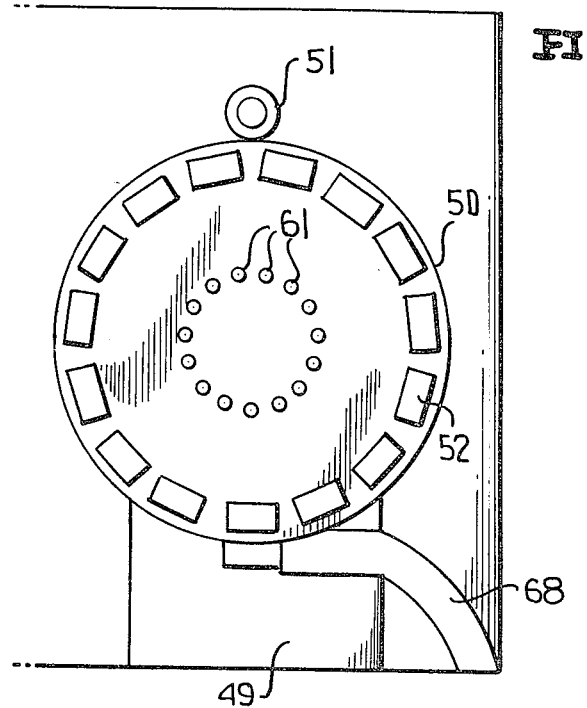
FIGS. 6 and 7 are top and bottom views respectively of a cassette storage magazine turret employed in the mechanism of FIG. 5.

Each of the remote vending machines includes a cassette changer 40 of the same general type as Norelco Model No. 2502. However, the Norelco cassette changer is modified as illustrated in FIGS. 4 and 4a for purposes of its utilization in the present invention. Specifically the changes to the cassette changer are as follows: (1) the playback head is removed and replaced by a four channel cassette duplicator head 41; (2) a second motor M2 is provided along with existing motor M1; (3) the drive belt 43 connected to the cassette duplicator fly wheel 44 is moved from motor M1 to the newly added motor M2; (4) a pause solenoid 45 is added; (5) the eject button is removed; and (6) the eject relay, formerly actuated by the eject button, is driven by logic circuitry illustrated in detail in FIG. 10. Motor M2 thus drives capstan 46 which in turn drives idler 47 to drive the take up reel 48 of the cassette currently in the duplicator 49. Motor M1 is left to drive the changer mechanism alone in the same manner as in the Norelco cassette changer.

Operation of the vending machine is more clearly understood with reference to FIGS. 5, 6, 7 and 8. More specifically, the vending machine includes a frame having a base plate 54 below which is mounted substantially all of the electronic circuits required for operation of the vending machine. A generally circular turret frame 53 is supported above and spaced from base plate 54. Turret frame 53 has a plurality of holes 60 defined therethrough and forming a circle about the center of the frame. A flat circular turret member 50 is rotatably supported by turret frame 53 for rotation about an axis extending through the centers of both turret member 50 and turret frame 53. A plurality of index holes 61 are defined through turret member 50 and form a circle of size identical to the circle formed by guide holes 60. The guide holes are equal in number to the index holes and in the example illustrated fifteen of each set of holes are provided.

Figure 7:
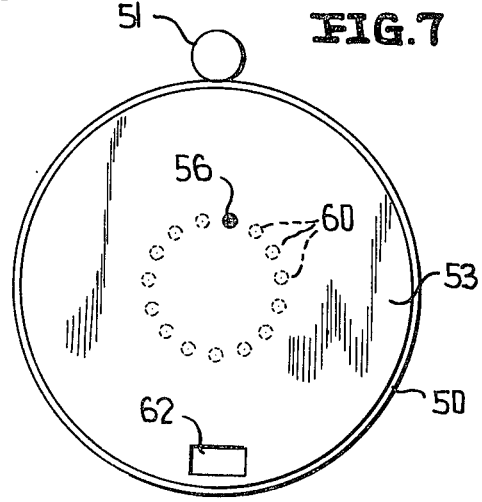
Figure 8:
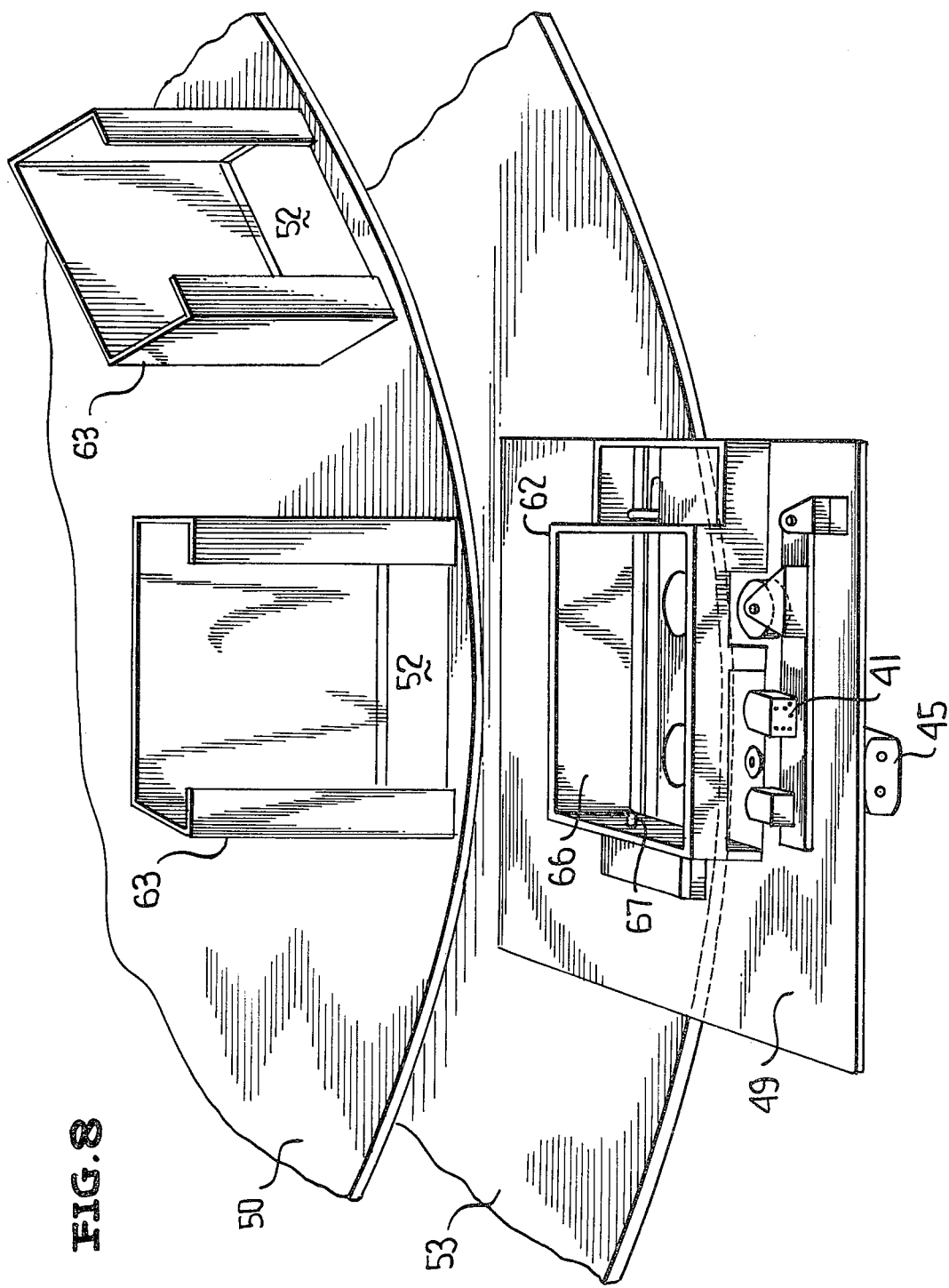
FIG. 8 is a partial view in perspective of the mechanism of FIG. 5 wherein the loading of cassettes into a duplicator is diagrammatically illustrated.

A plurality of rectangular holes 52 are defined through turret member 50 and form a circular path adjacent the periphery of the turret member. The number of rectangular holes 52 is equal to the number of index holes 61. The size of rectangular holes 52 is slightly greater than the size of a tape cassette to be employed with the vending machine of the present invention. Extending upwardly from each rectangular hole 52 is a cassette storage magazine 63 arranged to support a stack of tape cassettes. The bottom cassette in each stack is supported on the upper surface of turret frame 53 and slides along that surface as turret member 50 rotates. For this purpose, the spacing between turret member 50 and turret frame 53 is less than the thickness of a cassette. A single rectangular hole 62, also slightly larger than the size of a cassette, is provided in turret frame 53 as best illustrated in FIG. 7. When turret member 50 is rotated so that a stack of cassettes overlies hole 62 in turret frame 53, the lowermost cassette in the stack is free to fall through the turret frame. Located immediately below rectangular hole 62 is the duplicator mechanism 49 which is arranged to receive cassettes from the turret member.

A turret timing solenoid 55 is disposed beneath turret frame 53 and includes an armature in the form of turret alignment rod 56. Alignment rod 56 extends upwardly through turret frame 53 and turret member 50 through a pair of aligned holes 60, 61. In this manner rod 56 prevents relative rotation between the turret member and the turret frame. When solenoid 55 is energized rod 56 is axially retracted a distance sufficient to clear turret member 50 and thereby permit rotation of turret member 50 relative to frame 53. A flange 58 is secured to rod 56 at a location below frame 53 and acts to compress a spring 57 against the main frame of solenoid 55. Retraction of rod 56 upon energization of the solenoid is accomplished against the bias of spring 57 which continually urges the rod upwardly.

When flange 58 is retracted with rod 56 it actuates a microswitch 59 to supply energization current to motor M3. In addition flange 58 is arranged to actuate a motor lever 64 when solenoid 55 is energized, the lever in turn actuating a tension rod 65 to pull turret motor M3 toward turret 50 against the action of bias spring 66. This causes turret drive wheel 51 to peripherally engage the turret member 50 to effect a rim-drive operation.

A channel 66 of rectangular cross section extends downwardly from a rectangular hole 62 in turret frame 53 toward the cassette duplicator mechanism 49 and thereby provides a loading guide channel for the duplicator. A cassette sensing switch 67 is arranged in guide channel 66 to detect the presence or absence of a cassette in the storage magazine 63 aligned with duplicator 40.

When a storage magazine is aligned over opening 62 and guide channel 66, the lowermost cassette is in position to be recorded upon whereas the second lowermost cassette actuates cassette sense switch 67. This removes a ground signal from solenoid 55, maintaining the solenoid deenergized with turret alignment rod 56 engaging an appropriate one of index holes 61 in turret 50. When the duplication of information on the cassette in the duplicator is completed, a signal, generated in the manner described hereinbelow in relation to FIG. 10, actuates the eject mechanism to cause the full cassette to be ejected via port 68 and be taken by the consumer. Ejection of the cassette is effected in the same manner as in the Norelco Model 2502 Cassette Changer when the eject button therein is actuated.

When the last cassette of the storage magazine 63 is in the duplicator, the cassette sensing switch 67 is released to provide a ground for turret timing solenoid 55. The latter is energized thereby, causing alignment rod 56 to retract and unlock turret 50 relative to frame 53. In addition flange 58 actuates microswitch 59 and lever 64 to energize motor M3 and bring motor drive wheel 51 into engagement with turret 50. The turret is rotated at the rate of approximately 1/6 revolution per minute. Approximately ½ inch before the next storage magazine 63 is aligned with hole 62 and guide channel 66, the lowermost cassette in that magazine drops into channel 66 to actuate switch 67. This removes the ground signal from solenoid 55 which nevertheless is maintained in a condition with rod 56 retracted due to the fact that the rod is not yet aligned with an index hole 61. The turret therefore continues to rotate, as driven by motor M3, until index hole 61 is aligned with rod 56 which thereupon is pushed by spring 57 through index hole 61 to lock the turret in place.

In the manner described in the preceding paragraphs, turret member 50 is sequentially stepped one magazine position at a time as each storage magazine 63 is emptied.

Figure 9:
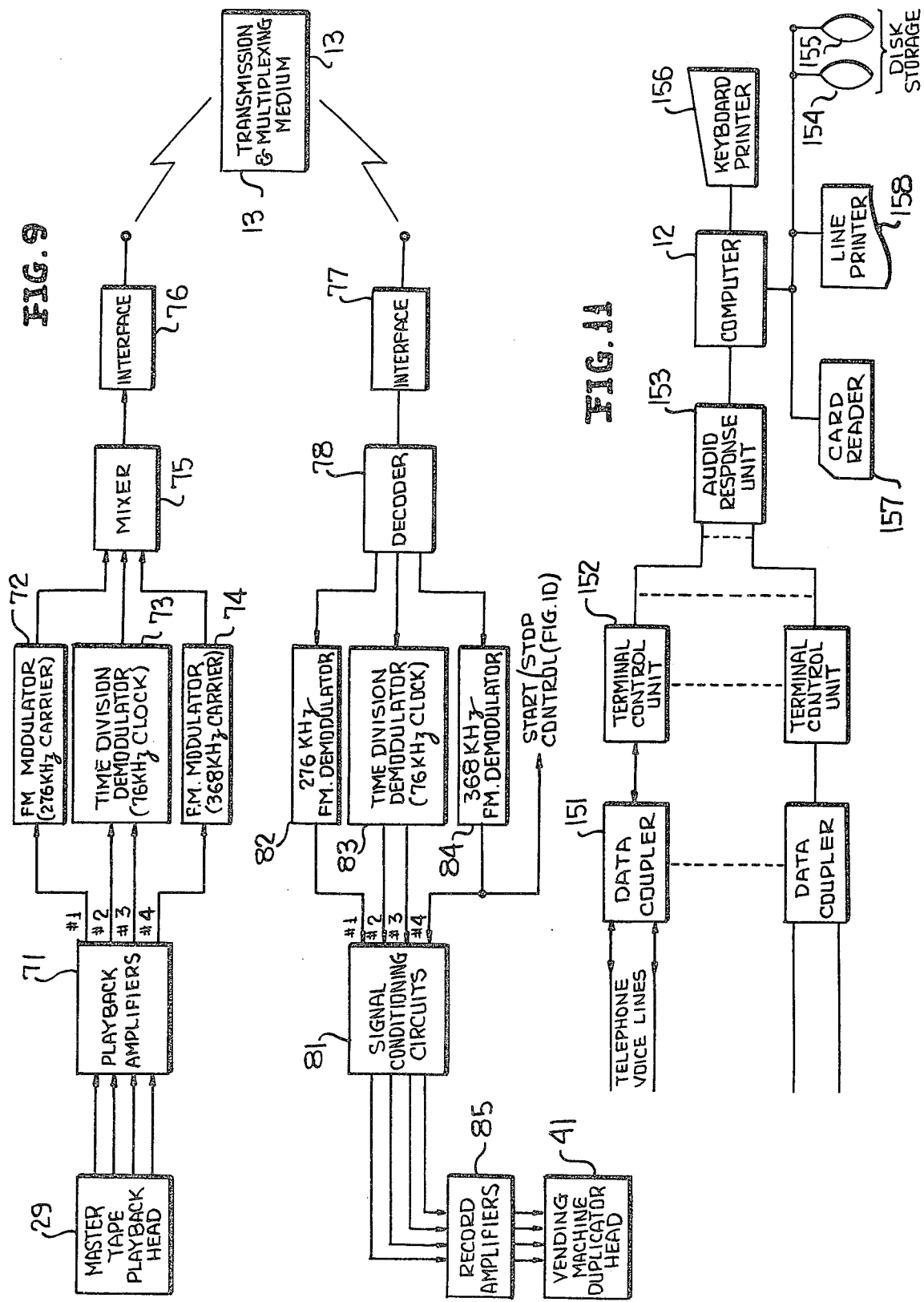
FIG. 9 is a functional block diagram illustrating transmission and multiplexing of signals between the master tape station and the vending machines in the system of FIG. 1.

Audio signal transmission between a master tape playback head and a vending machine is illustrated functionally in FIG. 9. The four audio output signals from a typical playback head 29 at the master tape center are applied to respective playback amplifiers 71. Each of amplifiers 71 may comprise a Telex Model TDA-1, and is preferably mounted integrally with the master tape transport cavity rack 20 of FIG. 2. One set of amplifiers 71 is provided for each master tape. Transmission from the master tape center is assumed to be accomplished by means of American Telephone and Telegraph picture phone trunks. To save the number of lines which must be switched, the four amplified playback signals are multiplexed into a single line for each master tape. Audio playback channel No. 1 is FM-modulated on a 276 KHz carrier at modulator 72. Channels No. 2 and No. 3 are time division modulated with a 76 KHz clock at modulator 73. Channel No. 4 is FM-modulated on a 368 KHz carrier at modulator 74. The three output signals from modulators 72, 73 and 74 are resistively mixed at mixer 75 and terminated at zero db level at American Telephone and Telegraph picture phone PBF interface unit 76. The composite signal is transmitted through an American Telephone and Telegraph picture phone wide band trunk, as described in relation to FIG. 1, to the picture phone wide band switching central office exchange 13. The composite signal is then switched to the appropriate calling picture phone trunks and transmitted to the vending machine stations. Each station terminates the received signal in American Telephone and Telegraph picture phone PBF interface unit 77 which in turn delivers the signal to a decoder unit 78 which separates the 276 KHz carrier, the 368 KHz carrier and the 76 KHz time divided signals. The 276 KHz signal is demodulated by FM-demodulator 82 to restore the channel No. 1 audio signal. Likewise the 368 KHz signal is demodulated by FM-demodulator 84 to restore the channel No. 4 signal. The channels No. 2 and No. 3 signals are restored by time division demodulator 83. The four demodulated audio signals are then delivered to signal conditioning circuits 81 which by way of example may be Dolby Model 320 signal conditioners. The conditioned signals are then delivered to record amplifiers 85 before being applied to the vending machine duplicator head 41. Amplifiers 85 may be Telex Model TDA-1 amplifiers.

The demodulated channel No. 4 signal, in addition to providing audio information from one of the master tape tracks, serves a control function in that it also carriers an 80 Hz tone which is recorded between selections on the master tape. This signal is employed in FIG. 10, in the manner described below, as a start/stop control signal.

Figure 10:
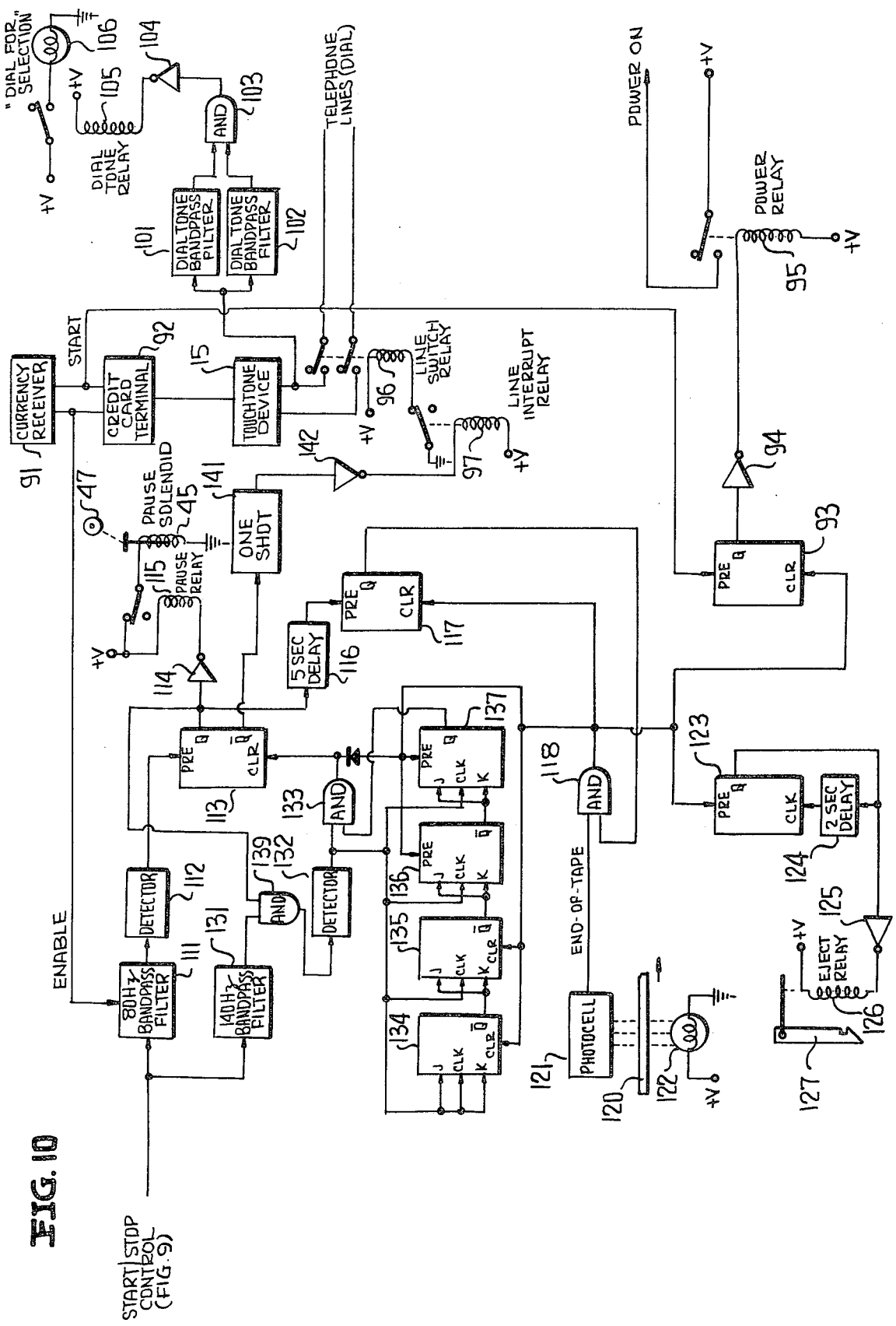
FIG. 10 is a logic diagram illustrating functional operation at each vending machine in the system of FIG. 1.

Referring now to FIG. 10 of the accompanying drawings there is illustrated a logic circuit employed in each vending machine to control operation in response to deposit of currency or insertion of a credit card into the vending machine by a consumer. For purposes of illustration only, a positive logic convention is employed in FIG. 10 whereby a relatively positive signal is considered binary 1 and a relative negative signal is considered binary 0. Initiation of operation at a vending machine occurs upon deposit of currency in a currency receiver 91 or insertion of a credit card in credit card terminal 92. Currency receiver 91 is a conventional currency receiver of the type which gives a positive voltage signal upon receipt of a preestablished amount of currency. Credit card terminal 92 is also conventional and may for example be the type manufactured by IBM as Model 2730-1. Assuming first the receipt of the proper amount of currency at receiver 91, a binary 1 signal is applied to the preset terminal of flip-flop 93 to force a binary 1 signal at the Q output terminal of that flip-flop. Flip-flop 93, as well as all of the flip-flops described herein, may be of the type manufactured by Texas Instruments Model SN7476. The binary 1 Q signal from flip-flop 93 actuates relay driver 94, which is simply a binary inverter, to energize the power relay 95. Energization of power relay 95 closes the normally open contacts of that relay to apply power to the electronics and control circuits of the vending machine. Application of power to the vending machine circuits energizes line relay 96 through a path provided by the normally closed contacts of line interrupt relay 97. Energization of line switch relay 96 connects the telephone dial lines for the vending machine to a conventional touch tone dialing device 15. In addition the dial tone from the telephone dial lines is connected through contacts of relay 96 to a pair of dial tone band pass filters 101 and 102, which filters include detection circuits which provide binary 1 output signals whenever a signal at the standard dial tone frequency is received. The output signals from filters 101 and 102 actuate AND gate 103 which in turn actuates relay driver 104 to energize dial tone relay 105. When relay 105 is energized its normally open contacts close to light the "dial for selection" lamp 106 on the front panel of the vending machine. The customer is now able to push an appropriate combination of push buttons at touch tone device 15 to select whichever master tape he wishes duplicated at the vending machine. A number code for each master tape will normally be provided at each vending machine to facilitate selection by the customer.

In addition to turning on the power and actuating the touch tone device 15 insertion of the proper amount of currency in currency receiver 91 generates an enable signal which is applied to an 80 Hertz band pass filter 111. The enable signal effectively provides power to the band pass filter rendering it responsive to pass signals within a band centered about 80 Hertz. The input signal to the 80 Hertz filter is the start/stop control signal derived from input channel No. 4 in FIG. 9. There is an 80 Hertz control tone recorded between selections on each master tape. In order to prevent initiation of master tape duplication in the middle of a selection, the 80 Hertz tone, in the manner to be described below, permits access to the master tape by the vending machine. Thus the currency receiver 91, by virtue of its generation of the enable signal, puts the vending machine in a mode whereby it is awaiting access to the master tape selected at touch tone device 15.

Operation of the vending machine by credit card is substantially the same as that described for currency, with the exception that credit card operation requires credit checking and billing operations at the computer 12 before the vending machine is permitted access to the selected master tape. These credit checking and billing operations are described below in reference to FIG. 11. For purposes of describing the remainder of FIG. 10 it is assumed that the proper amount of currency has been received by receiver 91 or that a valid credit card has been inserted in credit card terminal 92. In either case, both currency receiver 91 and credit card terminal 92 generate the start and enable signals mentioned above.

If the vending machine is awaiting access to a selected master tape, receipt of the 80 Hertz tone signal at filter 111 is detected by detector 112 to provide a binary 1 signal to preset flip-flop 113. The resulting binary 1 Q output signal from flip-flop 113 actuates relay driver 114 to energize pause relay 115. This closes the normally opened contacts of relay 115 to remove energization voltage from pause solenoid 45, causing the latter to release whereby capstan idler 47 is biased into engagement with capstan 46 (see FIG. 4a) and take up reel 48 to drive the latter and start the duplicator tape in motion. The recorded information transmitted by the selected master tape is thereby duplicated on the cassette currently in duplicator 49.

The transition from binary 0 to binary 1 at flip-flop 113 actuates a five second time delay 116 which, five seconds later, presets flip-flop 117, thereby priming AND gate 118. The five second delay before setting flip-flop 117 is necessary to prevent the clear leader portion of the cassette tape 120 to proceed past light source 122 and aligned photo cell 121 before AND gate 118 is primed. More specifically, there is clear (transparent) leader at both ends of the cassette tape 120. Light from lamp 122 passes through the clear leader to actuate photo cell 121, thereby rendering the resistance of the photo cell low. The actuated photo cell thereby provides a binary 1 end of tape signal to AND gate 118 which is thereby actuated when primed by flip-flop 117. If the clear leader at the beginning of the cassette tape 120 were permitted to actuate AND gate 118, the latter would clear flip-flop 113 to eventually disengage capstan idler 47 from the take up reel in the duplicator and thereby stop the tape before reproduction can begin. Once the clear leader portion of tape 120 is transported past photo cell 121 the end of tape signal is maintained binary 0 and AND 118 is inhibited.

Assuming the consumer wishes to duplicate an entire album recorded on a single master tape, duplicating of the master tape contents continues until the clear leader at the end of the cassette tape is detected by the photocell 121. It is assumed of course that the album on the master tape is of sufficient length to approximately fill the cassette. When the end of tape clear leader is detected AND gate 118 is actuated and provides a binary 1 signal to clear flip-flops 113 and 117. The clear pulse for both of these flip-flops is of relatively short duration since the clearing of flip-flop 117 provides a binary 0 Q output signal therefrom which disables AND gate 118.

Clearing of flip-flop 113 deactivates relay driver 114 to de-energize pause relay 115. The normally open contacts of relay 115 serve to complete the energization path for pause solenoid 45 which retracts its armature to remove the capstan idler 47 from contact with the take up reel in duplicator 49. Tape transport in the duplicator is thereby stopped. The end of tape pulse provided by AND gate 118 presets flip-flop 123 which responds by providing a binary 1 Q output signal. This Q output signal is applied to a two second delay circuit 124 which, two seconds later, clears flip-flop 123 so that the binary 1 state of the Q output signal is permitted to subsist for only 2 seconds. During that 2 second interval the binary 1 Q output signal actuates relay driver 125 to energize the eject relay 126 which operates latch 127 at the duplicator to eject the cassette through ejection port 68.

The end of tape output pulse from AND gate 118 also clears flip-flop 93 to de-energize power relay 95. Power is thereby removed from the control circuits in the vending machine until currency or a credit card is once again received. Removal of power de-energizes the line switch relay 96 to break contact between touch tone device 15 and the telephone dial line.

Assume now that the consumer, once having inserted the proper credit card or proper amount of currency, wishes to compose his own album from specially prepared solo selections on various ones of the master tapes. On these master tapes each selection is followed by a 140 Hertz control tone which, after a suitable interval, is in turn followed by the 80 Hertz control tone. If duplication has been initiated in the manner described above, before the end of tape signal terminates duplication, a 140 Hertz control tone is received after the first selection has been duplicated. This tone is received on the start/stop control signal line from FIG. 9 and is passed by the 140 Hertz band pass filter 131 to AND gate 139. The latter is controlled by the Q output signal of flip-flop 113 which will normally be binary 0 at this time. AND gate 139, therefore, is not enabled by a 140 Hz tone until an 80 Hz tone has been received. The first 140 Hz tone following an 80 Hz tone is then passed by gate 139. The passed tone is detected at detector 132 and applies a binary 1 signal to one input terminal of AND gate 133. In addition, the output signal from detector 132 is applied to the J and K input terminals of flip-flop 134, and to the CLK input terminals of each of flip-flops 134, 135, 136, and 137. These four flip-flops are connected as a binary counter which is preset by each end of tape signal from AND gate 118 to a count of twelve. Each detected 140 Hertz tone at detector 132 adds a count to the counter. Since a count of twelve is preset into the counter, the Q output signal from the most significant bit stage 137 is binary 1 when the first 140 Hertz tone is detected. Consequently both input signals to AND gate 133 are binary 1 and the gate is actuated to clear flip-flop 113. Clearing of flip-flop 113, as described above, retracts capstan idler 47 from the take up reel in the duplicator to inhibit transport of the cassette tape. In addition, clearing of flip-flop 113 provides a binary 1 $\overline{Q}$ to one shot multivibrator 141 which provides a binary 1 pulse of 5 seconds duration to actuate relay driver 142 for that period. Line interrupt relay 97 is therefore momentarily energized to in turn de-energize the line switch relay 96 and remove the telephone dial lines from the vending machine circuits for the 5 second period of one shot multivibrator 141. After the 5 seconds the output signal from one shot multivibrator 141 goes to binary 0, inhibiting line interrupt line relay 97 to thereby re-energize line switch relay 96. The telephone dial lines are once again connected to the circuit, the dial tone returns, and the dial for selection lamp 106 is lit in the manner described above. The consumer may then choose his next selection by pressing the proper combination of buttons at the touch tone device 15. When the master tape containing the selection is connected to the vending machine by the switching circuitry, the circuitry awaits the next 80 Hertz tone from that tape. If that master tape is in the middle of a selection when the vending machine is connected, the 140 Hz stop tone at the end of the selection is precluded from having any effect by AND gate 139. Specifically, gate 139 is inhibited by flip-flop 113 until the next 80 Hz start tone is received. When the 80 Hz tone is received flip-flop 113 is preset once again to prime AND gate 139 for the next 140 Hz control tone. In addition, flip-flop 113 initiates cassette tape transport and primes the end-of-tape AND gate 118.

At the end of the current selection the 140 Hertz tone appears once again to suspend cassette tape transport in the manner described above. In addition the 140 Hertz tone adds a count to the binary counter comprising flip-flops 134 through 137. Operation proceeds as described to permit the consumer to make a series of selections. At the end of the fourth selection the 140 Hertz tone recycles the counter comprising flip-flops 134 through 137 to all zero states. Thus at the end of the fifth selection AND gate 133 is disabled by the binary Q signal from flip-flop 137. The 140 Hertz tone at the end of the fifth selection is therefore unable to clear flip-flop 113. Instead, the cassette tape is permitted to run to the end at which point photo cell 121 detects the clear leader and disconnects the vending machine from the master tape center in the manner described above.

Considering the operation of the system in response to insertion of a credit card in terminal 92, the start signal presets flip-flop 93 to energize power relay 95 and apply power to the system. Line switch relay 96 is energized by the applied power to in turn apply the telephone dial lines to touch tone device 15. Telephone line coupling to the computer is illustrated in FIG. 11 and is effected by a data coupler circuit 151 and terminal control unit 152, one each for each computer telephone line. The data coupler unit 151 may be a conventional Western Electric CBS Model and the terminal control unit 152 may for example be the IBM Model 2968-9 unit. A common audio response unit 153 for all of the telephone lines at the computer responds to a call up from a vending machine by sending an interrogate pulse over the telephone lines to the credit card terminal 92 at the vending machine. The credit card terminal responds by reading the magnetic strip on the inserted credit card and transmits the numbers in digital form back over the telephone line to audio response unit 153. The computer 12 checks the received credit card number and verifies the status of the card. If the credit card is verified as a valid card, audio response unit 153 transmits an indication to the credit card terminal via the telephone dial lines. The credit card terminal responds by generating the enable signal to actuate the 80 Hertz band pass filter 111 and permit duplication to proceed upon receipt by the vending machine of the next 80 Hertz control tone. In addition the computer adds the cost of the album or selections being recorded to the appropriate file in the computer storage disks 154 and 155. The accumulated billings for each customer can be accessed and billed at a specified period of each month. In addition the computer stores the number of the album or selections duplicated for internal records for payment of royalties to recording companies. Another important feature of the system is its capability of providing instantaneous popularity ratings for the various records. These ratings are easily computed by computer 12.

Computer 12 is preferably an IBM 360 computer, Model 25. It utilizes a key board printer 156 which is preferably IBM Model No. 1052, a card reader 157, which for example may be IBM Model 1402, and a line printer 158, which for example may be IBM Model No. 1403, are employed in conjunction with computer 12. Storage disks 154 and 155 may for example be IBM Model No. 2311.

In the foregoing description a four track system is assumed whereby each master tape contains four recorded tracks and each vending machine cassette contains four recorded tracks. The recorded format may be two channel stereo or four channel quadraphonic as desired. Those master tapes containing a complete album are provided with 80 Hertz tone signals between each selection as described above. Those master tapes from which individual selections may be chosen to compose a unique album have only the one selection stored repetitively on that tape. For the album tapes the two channel stereo programs are specially arranged so that the two tracks on the one side of the album have a selection of approximately the same timed length as the selection recorded on the adjacent two tracks of the other album side. This feature permits access to all four tracks simultaneously at a master tape location between selections. It is to be noted that all four tracks are transmitted to the vending station simultaneously to minimize the duplicating time. Since the cassette which receives the master tape information must be turned over when playing back different sides of the album, the simultaneous four track duplication requires that two of the tracks be duplicated while running backwards. In duplicating there is no quality deterioration if tracks are running backwards.

Where the four channel quadraphonic format is used, it is obvious that the relative lengths of adjacent track pairs takes care of itself automatically since the same selection is recorded on all four tracks.

For the two channel stereo format the standard C-30 cassette can be employed at the vending machines. In the four channel quadraphonic system, playing time of the finished tape is half that for the two channel stereo format; in such case the standard C-60 cassette may be employed.

The standard master tape uses the Dolby A-Parameter Noise Reduction System and is recorded at 3 ¾ ips real time and played on the master transport at 15 ips. The cassette duplicator slave recorder in the vending machine converts the information to the B-Parameter Dolby Noise Reduction System which is compatible with consumer tape players and records at 7 ½ ips. The vending process time would be 3 ¾ minutes on a C-30 cassette. Using the new cromium dioxide tape and the Dolby A-Parameter Noise Reduction System, the master tape is recorded at 1 ⅞ ips real time speed and played on the master transport at 15 ips. The cassette duplicator slave recorder in the vending machine would run at 15 ips. The vending process time for a C-30 cassette would be 1 ⅞ minutes. The masters may also be recorded using the B-Parameter Dolby Noise Reduction System in which case conversion processing would not be required in the vendor duplicator, but the quality of reproduction would not be quite as high as in the A-Parameter master processed to B-Parameter finished product cassette. Crystal ferrite record, reproduce heads are used in this system to compensate for the increased wear factor using the higher performance, more abrasive cromium dioxide tape running at higher speeds. Standard Telex 235 Series duplicator electronics designs may be used in both systems. Special line matching transformers are metered, adjustable output voltage preamps are used to meet AT&T transmission specifications to interface with AT&T transmission lines. The speed can be increased to 60 ips with present technology applied by any qualified audio design engineer using CATV transmission cable, privately installed wideband coaxial cable or AT&T wideband facilities if new technology in transmission makes it economically feasible. Duplicator process time would be less than 30 seconds on a C-30 cassette.

It will be appreciated, of course, that the multiplexing frequencies specified in relation to FIG. 9 are intended to be by way of example only and not limiting on the scope of the invention. The specified frequencies, in fact have been correlated with the illustrative duplicating speed mentioned in the preceding paragraph to minimize distortion. The utilization of different duplicating speeds will usually require a suitable change in the multiplexing frequencies.

In addition, the use of the AT&T picture phone system, as that system presently exists, requires that the transmitted signals be in analog form due to the relatively limited system bandwidth. The projected color picture phone system has a wider bandwidth than the present black-and-white system; consequently, the projected picture phone system will be able to handle digital signal transmission whereby digital to analog and analog to digital converter would be incorporated in a conventional manner in the system of the present invention.

The program format, tape size, and cartridge style may obviously be varied as desired. For example, eight channel eight-track cartridge duplicating is possible. Such a system would in effect require the doubling of the electronics in the system described above for four channel duplicating. Whereas the four channel cassette masters employ ½ inch tape, the eight track cartridge masters would employ 1 inch tape. In fact, master tape transports can be expanded to any tape width desired or any number of channels desired. The important factor is not the number of channels or the program format but rather the concept of remotely vending cartridge-type storage components on which centrally stored information is duplicated on command. Naturally, for the eight track vending machine the operation would be substantially the same as for the four track machine described above except that the four track cassette duplicator would be replaced by an eight track cartridge duplicator, the turret storage magazines would be enlarged to accommodate the larger eight track cartridges, the multiplexing equipment would be expanded to include eight multiplexed channels, and the vending machine audio circuits would be effectively doubled in number.

In addition to variations in the format and configuration of the storage media, signal transmission between the vending machine and the central station can be effected in a number of alternative ways. For example, reference being made to FIG. 12, alternative microwave tansmission may be effected by using the Jerrold SRL-1 microwave system or equivalent. This system may be employed in point to point transmission when transmitting four channels on each microwave link for as many as eight miles without the necessity for relay stations. The four signal channels delivered from each master tape at tape center 11 are applied to respective Jerrold Model SRL-1 exciters 161, 162, 163 and 164. The resulting four output signals are applied to the Jerrold Model SRL-1 transmitter 160 and transmitted by a microwave link 165. The transmitted signal is received by Jerrold Model SRL-3 receiver converter unit 166 where it is separated into four channels which are delivered to four standard VHF tuners 167, 168, 169 and 170. The tuner output signals are then applied to the vending machine in the same manner described above for the picture phone transmission system.

Alternatively, and reference is made to FIG. 13, CATV transmission may be employed for the vending machine system of the present invention. The present system may use existing CATV cable facilities without interferring with existing TV programs by connecting each master tape channel to a respective FM modulator such as the Jerrold AFM-2 FM modulator, designated by the numerals 171, 172, 173 and 174 in FIG. 13. The output signals from the FM modulators are combined and transmitted via CATV cable 175 to the appropriate vending machine location where the signal is applied to four FM tuners 176, 177, 178 and 179. The FM tuners may for example be McIntosh Model MR77 tuners utilized in their monaural mode (i.e. — multiplex switched off) and selected because of their excellent phase linearity at high frequencies. Standard FM broadcast frequencies of 88 to 108 MHz are employed for transmission in the approach of FIG. 13. The channels are placed 200 KHz apart thereby permitting 50 channels for each CATV system.

The central master tape center may be expanded to include any number of master tapes containing any mix of programs desired or necessitated by market conditions. The cartridges or video cassettes may be vended by employing the same concepts described herein. under such circumstances the master tape transport head would be replaced with a moving rotary helical-scan head for increased frequency response, the capstan speed would be changed to meet video tape speed format and the electronics would be changed to video type electronic systems. The vending machine duplicator transports would be changed in the same manner.

Of course, the most important concept of the present invention is the remote vending of centrally stored information, with payment being made at the vending location. For purposes of the present invention, the term "payment" is intended to main deposit of currency and/or use of an appropriate credit identification element, such as a credit card. In addition, it is contemplated that advertising messages may be included on vended cassette or cartridge, thereby providing another revenue-raising aspect of the system. Such advertising messages would be recorded on the master tapes along with the commercial recordings or other information.

While I have described and illustrated specific embodiments of my invention, it will be clear that variations of the details of construction which are specifically illustrated and described may be resorted to without departing from the true spirit and scope of the invention as defined in the appended claims.

I claim:

1. A central information distribution facility of the type in which information stored on plural individual endless tapes is selectively retrievable, said facility comprising:
- a multiple cavity rack, each cavity adapted to receive a tape cartridge;
- plural electrical connectors secured to said rack at each cavity location;
- a drive capstan having a longitudinal axis lengthwise through all of said multiple cavities;
- means for continuously rotating said drive capstan about its longitudinal axis;
- multiple tape cartridges each comprising:
    - a housing arranged to fit in and be received by any of said multiple cavities, said housing comprising first and second spaced walls defining an interior region therebetween, said interior region having a thickness which is slightly larger than the width of said endless tapes, said housing being arranged to be received in a cavity with the housing thickness extending in the direction of the longitudinal axis of said drive capstan;
    - a relatively large tape storage bin defined within said interior region;
    - a relatively small transient tape bin defined within said interior region;
    - an ingress opening and an egress opening for said transient tape bin;
    - an ingress opening and an egress opening for said tape storage bin, said ingress opening for said tape storage bin being the same opening as the egress opening for said transient tape bin;
    - a guide channel defined about a portion of the peripheries of said tape storage bin and said transient tape bin and extending from the egress opening of said tape storage bin to the ingress opening of said transient tape bin;
    - an endless tape having its major portion disposed in multiple folds within said tape storage bin and extending therefrom through the tape storage bin egress opening, along said guide channel, through the ingress opening for said transient tape bin, along a predetermined path through said transient tape bin and back into said tape storage bin through the ingress opening therefor, said tape being disposed with its width extending in the direction of the thickness of said housing;
    - a recessed portion of said housing arranged to receive said drive capstan adjacent said predetermined path when said housing is received by a cavity;
    - wherein said predetermined path in said transient tape bin comprises a playback head, a plurality of tape guide means for maintaining said endless tape taut as it passes said playback head, and pinch roller means urged toward said predetermined path to co-operatively and continuously engage said endless tape in driving relationship with said drive capstan; and
    - connector means electrically connected to said playback head and arranged to mate with said plural electrical connectors at the cavity in which said housing is received.

2. The combination according to claim 1 wherein each of said endless tapes has a plurality of information segments recorded thereon and spaced from one another along the length of said endless tape, the tape spaces between information segments having control signals recorded therein.

3. The combination according to claim 1 wherein the information recorded on at least some of said endless tapes is a single information record, recorded repetitively, there being control signals recorded at the start and termination of each repetitive portion of the record.

4. The combination according to claim 1 wherein said cartridges are devoid of record and erase heads.

5. The combination according to claim 1 wherein each of said tapes has multiple information tracks extending parallel to one another along its length, each track having a plurality of spaced information segments recorded thereon and spaced from one another by information gaps in which control signals are recorded, the gaps in each track being co-extensive.

* * * * *